United States Patent [19]
Felix et al.

[11] Patent Number: 5,203,010
[45] Date of Patent: Apr. 13, 1993

[54] RADIO TELEPHONE SYSTEM INCORPORATING MULTIPLE TIME PERIODS FOR COMMUNICATION TRANSFER

[75] Inventors: Kenneth A. Felix, Crystal Lake; Alton P. Werronen; Thomas B. Hart, both of Palatine; Scott A. Hardman, Island Lake; Thomas G. Hulsebosch, Palatine, all of Ill.

[73] Assignee: Motorola, Inc., Schaumburg, Ill.

[21] Appl. No.: 612,292

[22] Filed: Nov. 13, 1990

[51] Int. Cl.$^5$ .............................................. H04Q 7/00
[52] U.S. Cl. .................................. 455/33.2; 455/54.1; 455/56.1; 379/60
[58] Field of Search ........................ 455/33, 34, 54, 56, 455/33.1, 33.2, 34.1, 34.2, 54.1, 54.2, 56.1; 379/58, 59, 60, 63

[56] References Cited

U.S. PATENT DOCUMENTS

| | | | |
|---|---|---|---|
| 4,222,115 | 9/1980 | Cooper et al. | 455/33 |
| 4,308,429 | 12/1981 | Kai et al. | 455/56 |
| 4,475,010 | 10/1984 | Huensch | 455/56 |
| 5,047,762 | 9/1991 | Bruckert | 455/56 |
| 5,065,449 | 11/1991 | Gordon et al. | 455/33 |

Primary Examiner—Reinhard J. Eisenzopf
Assistant Examiner—Edward Urban
Attorney, Agent, or Firm—Richard A. Sonnentag; Raymond A. Jenski; Raymond J. Warren

[57] ABSTRACT

A cellular radiotelephone system transfers a call from a source base-site (200) to one target base-site (205,210). A source base-site (200) in the first RF coverage area (100) measures the signal strength (RSSI$_S$) of a mobile (225), provides a forecasted signal strength (RSSI$_F$) representing a would-be power increase of the mobile (225) and sets up two time windows. The source base-site (200) sends the measured and forecasted signal strengths to candidate target base-sites (205,210) found by the mobile (225) which measure the mobile (225) signal strength (RSSI$_T$) and compare it once to RSSI$_S$ plus a hysteresis value. If RSSI$_T$ is greater than RSSI$_S$, the call is transferred to the best responding cell. If RSSI$_T$ is below RSSI$_S$, RSSI$_T$ is compared to RSSI$_F$. During this time, the mobile 225 will increase power at the end of the first time window. If RSSI$_T$ is ever greater than RSSI$_F$ at any of the candidate target base-sites (205,210), the call is transferred to the responding target base-site (205,210). If the source base-site (200) receives no responses during the second time window, the process ends.

40 Claims, 5 Drawing Sheets

RADIO TELEPHONE SYSTEM INCORPORATING MULTIPLE TIME PERIODS FOR COMMUNICATION TRANSFER

FIELD OF THE INVENTION

This invention relates generally to cellular radiotelephone systems, and more particularly to cellular radiotelephone systems requiring communication transfer to maintain a call.

BACKGROUND OF THE INVENTION

In cellular radiotelephone systems, handoff of a mobile is required to maintain communication to the mobile as it moves from cell to cell in the system. Handoff is the process of transferring a call in progress from one RF coverage area to another in coordination with the movement of the mobile. It is also the process whereby a call is transferred to another channel within a RF coverage area because of interference within the coverage area. The process of handing off a call in progress is one of the most delicately balanced function related to cellular radiotelephone systems because it requires a high level of coordination among the various system processing elements to ensure successful operation. Failure to hand a call off at the proper time generally results in a reduction in the call quality, interference with neighboring coverage areas and even the undesired termination of the call.

Current analog cellular radiotelephone systems require that the system continuously monitor the quality of every call which is operational on the system. The system must recognize when the quality of a call falls below a predetermined threshold in a particular coverage area and must also determine what other coverage area can satisfactorily handle the call. Once a more suitable coverage area is identified, the system sends instructions to the mobile directing it to another channel. The mobile confirms that it is leaving its current channel, tunes to the new channel, synchronizes to the new channel and begins transmitting thereby confirming that it has arrived on the new channel.

In digital cellular radiotelephone systems, the procedure is modified somewhat in that the mobile is capable of measuring other channels as instructed by the system as well as its current channel and also that the mobile reports this information back to the system. These measurements consist of signal strength only and are relative as the measured results are likely to vary considerably due to varying environmental conditions. Because of this and because the mobile cannot determine if the measurement is that of an interferer or the correct channel, the system must scan the cell selected by the mobile.

Another factor to consider in the handoff process is in current cellular radiotelephone systems, the radiotelephone switch receives a handoff request from the source base-site and relays the message to potential target base-sites. The target base-sites will monitor the quality of transmission of the mobile and if the required conditions are met, the target base-site will respond back to the radiotelephone switch to let it know it is a good candidate. During this time, the radiotelephone switch waits a predetermined period of time to receive additional responses from all other potential target base-sites. If no responses are received from any target base-sites, the radiotelephone switch will relay a message to the source base-site to increase the signal level of the mobile unit. The source base-site knows that a given signal level step translates to a known signal level increase at the mobile thus the source base-site sets the signal level step accordingly. The source base-site again takes signal quality measurements on the transmission of the mobile and the entire process is repeated. This process of constantly requesting a handoff when the handoff condition has been met tends to overload the radiotelephone switch since handoff information is continuously being transferred throughout the system.

Still other systems have base-sites sending all received signal strength measurements back to the radiotelephone switch on a continuous basis to speed the handoff process. This method, however, creates a large amount of signal strength data traffic which the switch must preserve.

Thus, a need exists for a handoff procedure which increases handoff efficiency by reducing the number of handoff request processed from source base-site to base-site interface while at the same time reducing the length of the overall handoff process.

SUMMARY OF THE INVENTION

A radiotelephone system has a mobile unit communicating to a source base-site wherein the mobile unit requires a communication transfer from the source base-site to a selected one target base-site. The radiotelephone system obtains, at the source base-site, a first signal quality value of a signal received by the source base-site, provides a second signal quality value and provides at least a first predetermined time period and a second predetermined time period. The radiotelephone system, at at least the selected one target base-site, obtains a third signal quality value of a signal received by at least the selected one target base-site. The radiotelephone system, at at least the selected one target base-site, compares the first signal quality value to the third signal quality value and compares the second signal quality value to the third signal quality value, and responsive to the comparison, transfers communication from the source base-site to at least the selected one target base-site during at least the first predetermined time period.

DETAILED DESCRIPTION OF A PREFERRED EMBODIMENT

Figure 1:
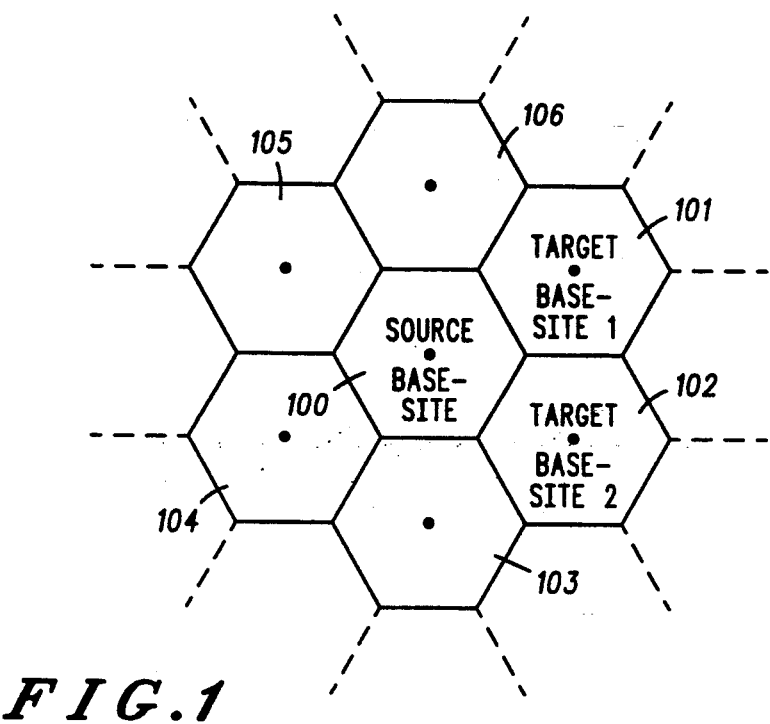
FIG. 1 generally depicts an idealized geographic layout of a digital radiotelephone system.

A typical configuration in a cellular communication system is shown in FIG. 1. A source cell 100 contains a source base-site and is bounded by target cells 101 through 106 containing six separate target base-sites. The source cell 100 contains the mobile that is traveling within the boundary of the source cell 100.

Figure 2:
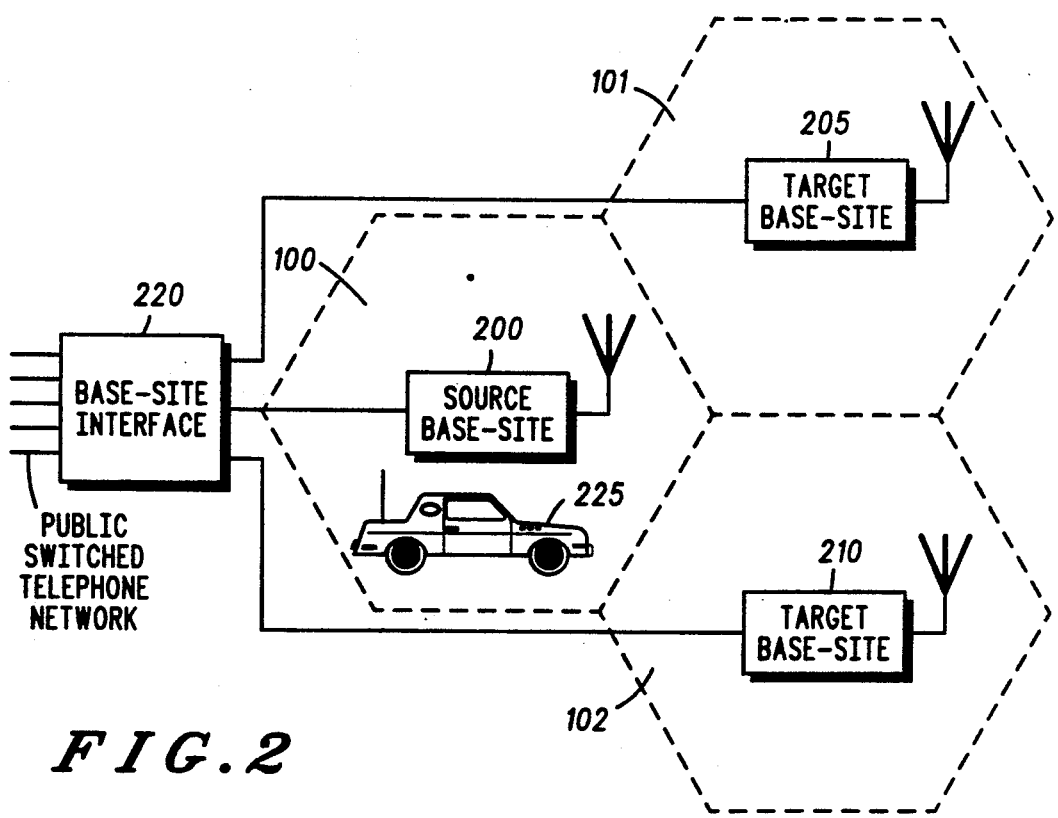
FIG. 2 depicts a mobile unit communicating to a source base-site and moving toward two candidate target base-sites.

FIG. 2 shows a magnified view of the source cell 100 and potential target cells 101 and 102. The source base-site 200 and the target base-sites 205 and 210 are coupled together through the base-site interface 220. The base-site interface 220 typically has input lines from the public service telephone network. The mobile 225 is communicating to the source base-site 200 throughout the boundary of the source cell 100 and moves toward target cells 101 and 102.

Figure 3A:
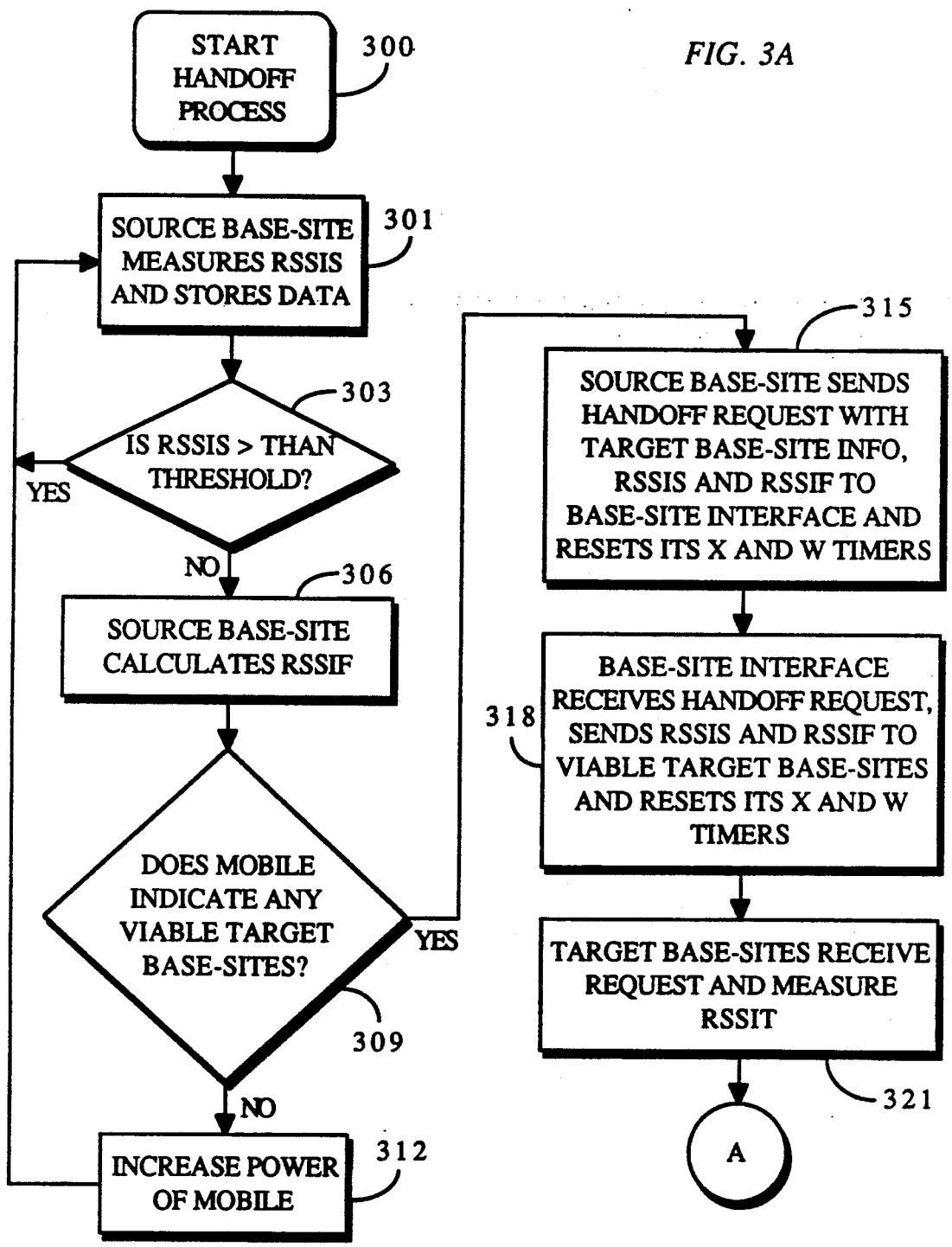
FIGS. 3A–3C, together, illustrate a flow diagram of the steps the digital radiotelephone system takes to transfer communication of the mobile unit in accordance with the invention.

FIG. 3 is a flow diagram of the handoff process the system undergoes as the mobile 225 moves away from the source base-site 200 to which it is communicating toward the target base-sites 205,210. Referring to FIG. 3A, the handoff process starts at 300 when the source base-site 200 measures at 301 a first (source) signal quality value and stored the data. The signal quality value is a received signal strength indication (RSSI) in the preferred embodiment. A test is then performed at 303 to determine if a first (source) signal quality value, $RSSI_S$, is greater than the transfer threshold. If $RSSI_S$ is greater, the source base-site 200 will continue to measure at 301 $RSSI_S$ and store the data. If $RSSI_S$ is below the transfer threshold, a second (forecasted) signal quality value, $RSSI_F$, is calculated at 306. $RSSI_F$ is a signal level value that the source base-site 200 would expect to receive if the power of the mobile were increased. The source base-site 200 is capable of calculating $RSSI_F$ because it knows the correlation between the power increase value it would send the mobile 225 and the would be power. A test is then performed at 309 to see if the mobile 225, which has been monitoring for viable target base-sites 205,210, has indicated any target base-sites 205,210. If no viable target base-sites 205,210 were found by the mobile 225, the power of the mobile 225 is increased at 312 and the source base-site 200 continues to measure at 301 $RSSI_S$ and store the data. If the mobile 225 does indicate viable target base-sites 205,210, a handoff request which includes the target base-site 205,210 information, $RSSI_S$ and $RSSI_F$ are sent at 315 to the base-site interface 220 and the first predetermined time period (X) and second predetermined time period (W) timers at the source base-site 200 are reset. In the preferred embodiment, the X time period is a 1-5 second time period the source base-site 200 will wait for the base-site interface 220 to respond; the base site interface 220 only responds if it receives a response from a target base-site 205,210. In the preferred embodiment, the W time period is a 7 second time period the source base-site 200 will wait for the base-site interface 220 to respond. The base-site interface 220 receives at 318 the handoff request, sends $RSSI_S$ and $RSSI_F$ to the viable target base-sites 205,210 located by the mobile 225 and resets its own X and W timers, which are both the same time period as the source base-site 200 X and W timers but slightly delayed compared to those of the source base-site 200. The target base-sites 205,210 receive at 321 the message and measure a third (target) signal quality value, $RSSI_T$, of the mobile 225.

Figure 3B:
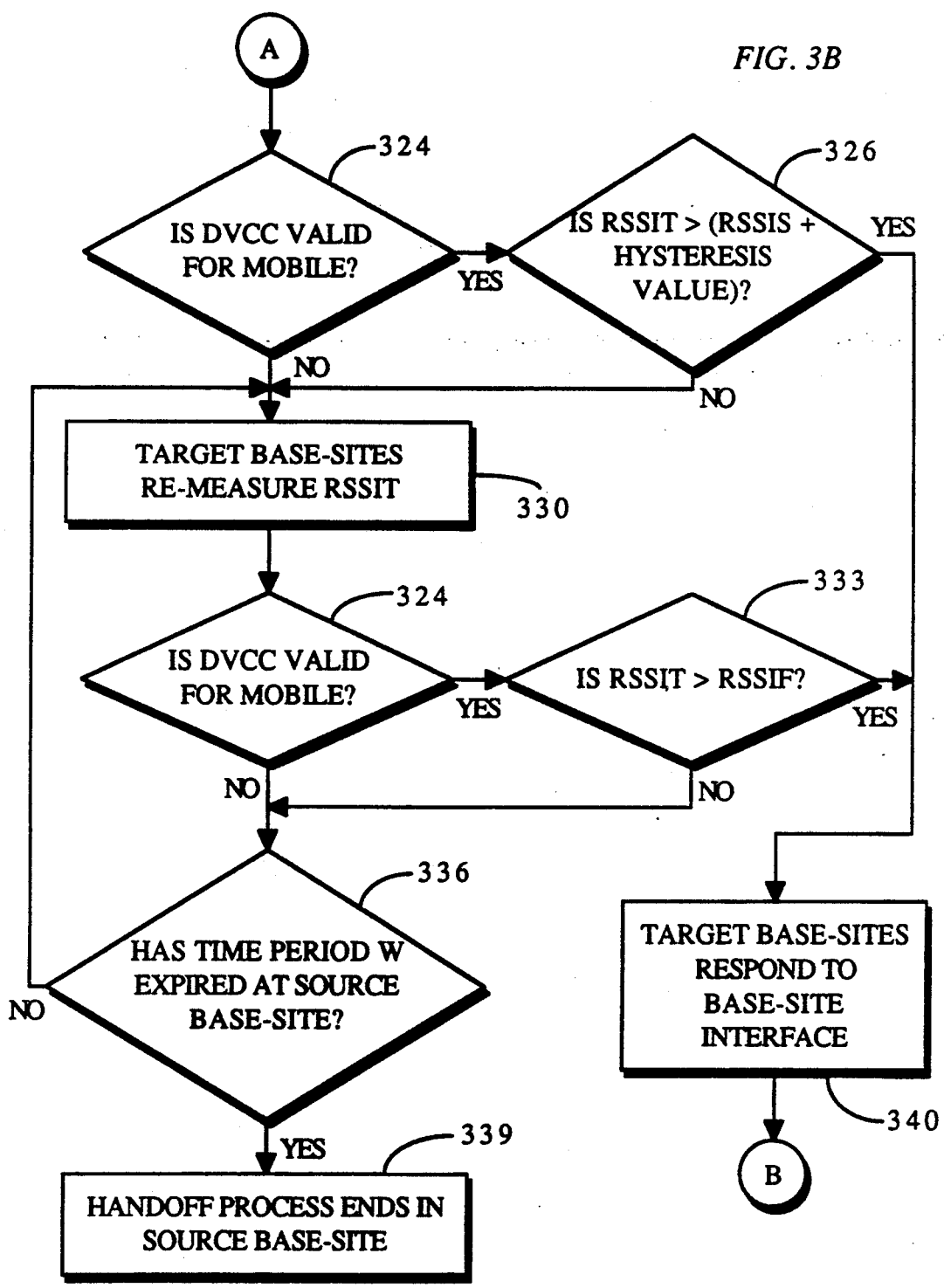

Turning to FIG. 3B, a test is performed at 324 to determine if the digital voice color code (DVCC) is valid for the mobile 225. The DVCC is a binary code given to the mobile 225 to distinguish it from other mobiles in the same or surrounding cells; in the preferred embodiment, it is used to ensure the target base-sites 205,210 are measuring RSSI of the same mobile 225 that the source base-site 200 measured. If DVCC is valid for the mobile 225, a test is then performed at 326 to determine if $RSSI_T$ is greater than $RSSI_S$ plus a hysteresis value. The hysteresis value is a value predetermined by the system designer which accounts for the different physical locations of the source base-site 200 and target base-sites 205,210, and can be positive, negative or zero. If $RSSI_T$ is greater than $RSSI_S$ plus the hysteresis value, a response is sent at 340 to the base-site interface 220 from the target base-sites 205,210 which have $RSSI_T$ greater than $RSSI_S$ plus the hysteresis value. If, from above, DVCC was not valid or $RSSI_T$ is not greater than $RSSI_S$ plus the hysteresis value, the target base-sites 205,210 re-measure at 330 $RSSI_T$. During this time and essentially in the background, the X timer at the source base-site 200 is timing the process and will increase the power of the mobile 225 if the X time period expires before the source base 200 receives a response from the base-site interface 220. Continuing, the test at 324 to check for DVCC validity of the mobile 225 is repeated. If DVCC is valid, a test is performed at 333 to determine if $RSSI_T$ is greater than $RSSI_F$. If $RSSI_T$ is greater than $RSSI_F$, a response is sent at 340 to the base-site interface 220 from the target base-sites 205,210 which have $RSSI_T$ greater than $RSSI_F$. If $RSSI_T$ is not greater than $RSSI_F$, a check is done at 336 to determine if the W time period has expired at the source base-site 200. If the W time period has not expired, the re-measurement at 330 is repeated. If the W time period has expired, the handoff process will end at 339 in the source base-site 200.

Figure 3C:
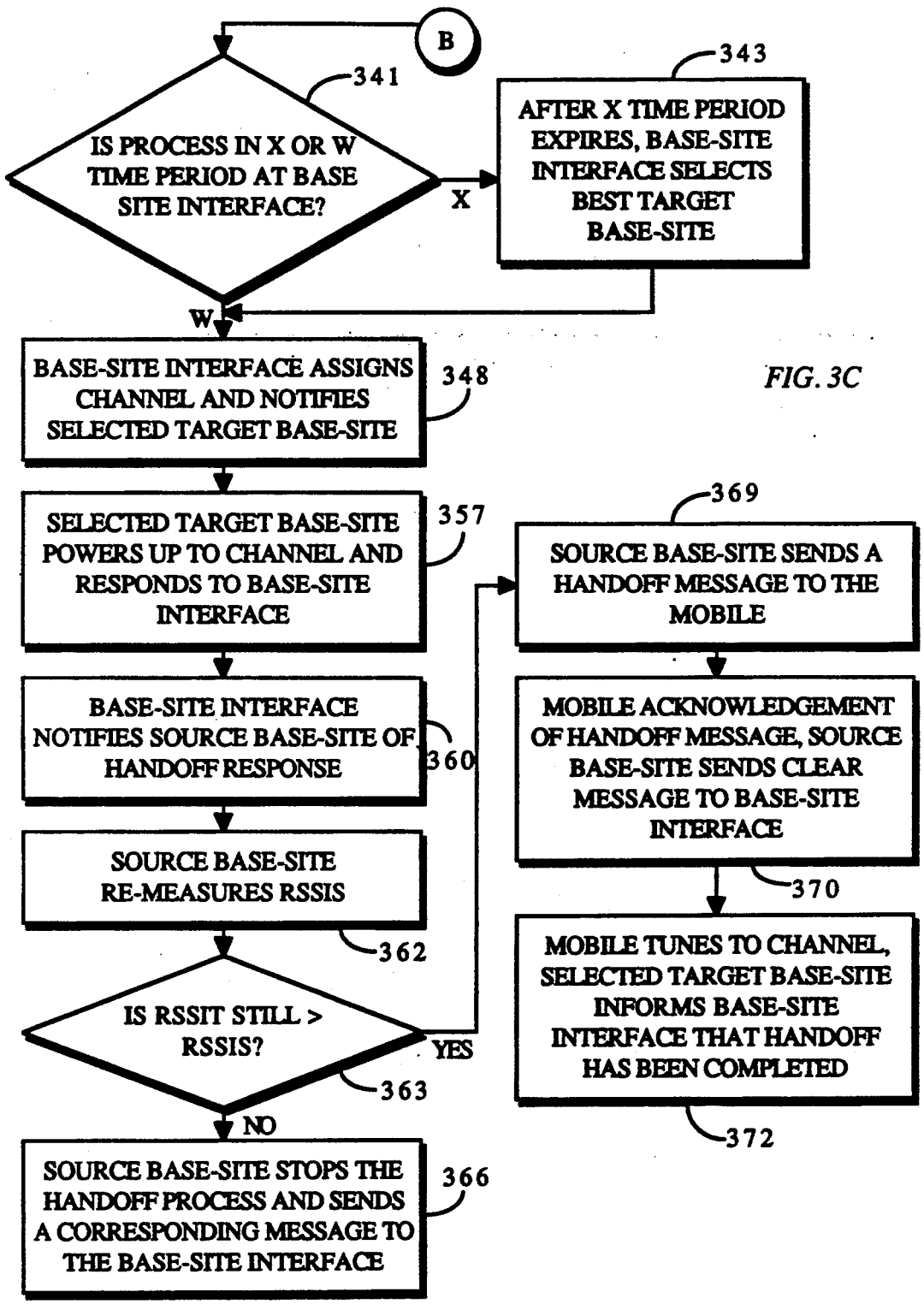

Referring to FIG. 3C, if a target base-site 205,210 responds to the base-site interface 220 during either the X or W time period at the base-site interface 220, a test is performed at 341 to determined if the handoff process is in the X or W time period. If the process is in the X time period, the base-site interface 220 selects at 343 the best target base-site 205,210 after the X time period expires. If the process is in the W time period, the base-site interface 220 will assign at 348 a channel to the selected target base-site 205,210 and notify that target base-site 205,210 of the channel. The selected target base-site 205,210 then powers up at 357 to that channel and responds back to the base-site interface 220. The base-site interface 220 notifies at 360 the source base-site 200 of the handoff response and the source base-site 200 remeasures $RSSI_S$ at 362. A test is then performed at 363 to determine whether $RSSI_T$ is still greater than $RSSI_S$. If $RSSI_T$ is below $RSSI_S$, the source base-site 200 stops at 366 the handoff process and sends a corresponding message to the base-site interface 220. If $RSSI_T$ is still greater than $RSSI_S$, the source base-site 200 will send at 369 a handoff message to the mobile 225. The mobile 225 acknowledgement of the handoff message is received at 370 and the source base-site 200 sends a clear message to the base-site interface 220. The mobile 225 tunes to the new channel and the selected target base-site 205,210 informs the base-site interface 220 at 372 that the mobile 225 is being received. Handoff of the mobile 225 from the source base-site 200 to the selected target base-site 205,210 has thus been completed.

Figure 4:
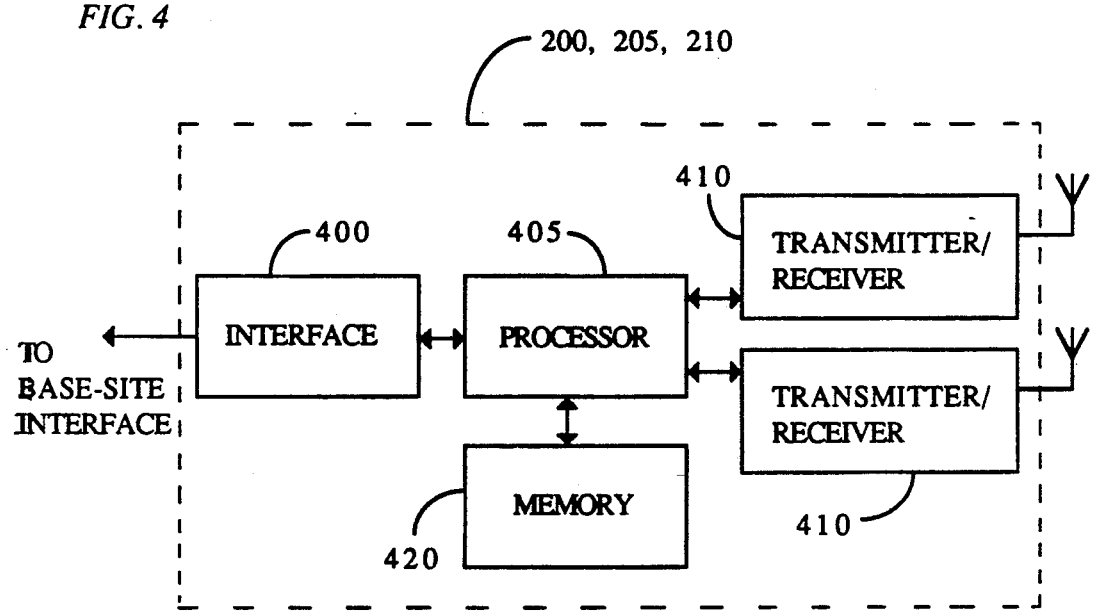
FIG. 4 depicts a block diagram of the source base-site and the target base-sites.

FIG. 4 depicts a block diagram of the source base-site 200 and the target base-sites 205, 210. A conventional interface 400 interfaces between a processor 405 and the base-site interface 220. The processor, which is a Motorola 68302 microprocessor in the preferred embodiment, is coupled to conventional memory 420 and also transmitter/receivers 410. The processor 405 controls the functions of the source base-site 200 and the target base-sites 205, 210 while the transmitter/receivers 410 provide an interface to the external RF environment.

If both the X and W time periods expire before communication transfer is required, the source base-site 200 may request a re-initialization of the process of FIG. 3. Significant to the process of FIG. 3 is the fact that the handoff process is given a greater chance to be completed with the same amount of handoff request sent by the source base-site 200, resulting in an improved handoff method while maintaining efficient base-site interface 220 throughput.

What I claim is:

1. A radiotelephone system having a mobile unit communicating to a source base-site, the mobile unit requiring a communication transfer from the source base-site to a selected one target base-site, the radiotelephone system comprising:

means, at the source base-site, for obtaining a first signal quality value of a signal when received by the source base-site;

means, at the source base-site, for providing a second signal quality value;

means, at the source base-site, for providing at least a first predetermined time period and a second predetermined time period;

means, the selected one target base-site, for obtaining a third signal quality value of said signal when received by the selected one target base-site;

means, at the selected one target base-site, for comparing said first signal quality value to said third signal quality value during said first predetermined time period and for comparing said second signal quality value to said third signal quality value during said second predetermined time period; and means, responsive to said means for comparing, for transferring communication from the source base-site to the selected one target base-site during at least either said first predetermined time period or said second predetermined time period.

2. The radiotelephone system of claim 1 wherein said means for obtaining a first signal quality value further comprises means for providing a hysteresis value correlating the physical location of the source base-site and the selected one target base-site.

3. The radiotelephone system of claim 2 wherein said means for comparing further comprises means for responding when said third signal quality value is greater than said first signal quality value plus said hysteresis value.

4. The radiotelephone system of claim 1 wherein said means for comparing further comprises means for responding when said third signal quality value is greater than said second signal quality value.

5. A radiotelephone system having a mobile unit communicating to a source base-site at a predetermined signal level, the source base-site having requested a transfer of communication of the mobile unit from the source base-site to a selected one target base-site, the radiotelephone system comprising:

means, at the source base-site, for obtaining a first signal quality value of a signal when received by the source base-site;

means, at the source base-site, for providing a second signal quality value;

means, at the source base-site, for providing at least a first predetermined time period and a second predetermined time period;

means, at the selected one target base-site, for obtaining a third signal quality value of a signal when received by the selected one target base-site;

means, at the selected one target base-site, for comparing said first signal quality value to said third signal quality value during said first predetermined time period and for comparing said second signal quality value to said third signal quality value during said second predetermined time period;

means, coupled to said means for comparing, for responding during said first predetermined time period when said third signal quality value is greater than said first signal quality value and for responding during said second predetermined time period when said third signal quality value is greater than said second signal quality value;

means, coupled to said means for responding, for monitoring said responses; and means, responsively coupled to said means for monitoring, for transferring communication from the source base-site to the selected one target base-site.

6. The radiotelephone system of claim 5 further comprising means for providing a plurality of mobile unit signal level increase values, including a first mobile unit signal level increase value.

7. The radiotelephone system of claim 6 wherein said means for providing a plurality of mobile unit signal level increase values further comprises means for altering the predetermined signal level by at least said first mobile unit signal level increase value.

8. The radiotelephone system of claim 7 wherein said means for altering further comprises means for altering the predetermined signal level at the end of said first predetermined time period.

9. The radiotelephone system of claim 5 wherein said means for providing a second signal quality value further comprises means for calculating said second signal quality value from the first signal quality value and a first mobile unit signal level increase value.

10. A radiotelephone system having a mobile unit communicating to a source base-site at a predetermined signal level, the source base-site having requested a transfer of communication of the mobile unit from the source base-site to a selected one target base-site, the radiotelephone system comprising:

means, at the source base-site, for obtaining a first signal quality value of a signal when received by the source base-site;

means, at the source base-site, for providing a second signal quality value;

means, at the source base-site, for providing at least a first predetermined time period and a second predetermined time period;

means, at the source base-site, for receiving information from the mobile unit;

means, at the selected one target base-site, for obtaining a third signal quality value of a signal when received by the selected one target base-site;

means, at the selected one target base-site, for comparing said first signal quality value to said third signal quality value during said first predetermined time period and for comparing said second signal quality value to said third signal quality value during said second predetermined time period;

means, coupled to said means for comparing, for responding during said first predetermined time period when said third signal quality value is greater than said first signal quality value and for responding during said second predetermined time period when said third signal quality value is greater than said second signal quality value;

means, coupled to said means for responding, for monitoring said responses; and means, responsively coupled to said means for monitoring, for transferring communication from the source base-site to the selected one target base-site.

11. The radiotelephone system of claim 10 wherein said information received by said means for receiving further comprises the selected one target base-site.

12. The radiotelephone system of claim 10 further comprising means for providing a plurality of mobile unit signal level increase values, including a first mobile unit signal level increase value.

13. The radiotelephone system of claim 12 wherein said means for providing a plurality of mobile unit signal level increase values further comprises means for altering the predetermined signal level by at least said first mobile unit signal level increase value.

14. The radiotelephone system of claim 13 wherein said means for altering further comprises means for altering the predetermined signal level at the end of said first predetermined time period.

15. The radiotelephone system of claim 10 wherein said means for providing a second signal quality value further comprises means for calculating said second signal quality value from the first signal quality value and a first mobile unit signal level increase value.

16. A base-site apparatus communicating to a mobile unit in a radiotelephone system, the mobile unit requiring a transfer of communication from the base-site apparatus to another base-site apparatus, the base-site apparatus comprising:
    means, when the base-site apparatus is a source base-site, for obtaining a first signal quality value of a signal when received by the source base-site;
    means, when the base-site apparatus is a source base-site, for providing a second signal quality value;
    means, when the base-site apparatus is a source base-site, for providing at least a first predetermined time period and a second predetermined time period;
    means, when the base-site apparatus is a target base-site, for obtaining a third signal quality value of said signal when received by the selected one target base-site;
    means, when the base-site apparatus is a target base-site, for comparing said first signal quality value to said third signal quality value during said first predetermined time period and for comparing said second signal quality value to said third signal quality value during said second predetermined time period; and
    means, responsive to said means for comparing, for transferring communication from the base-site apparatus that is a source base-site to the base-site apparatus that is a target base-site during at least either said first predetermined time period or said second predetermined time period.

17. The base-site apparatus of claim 16 wherein said means for obtaining a first signal quality value further comprises means for providing a hysteresis value correlating the physical location of the base-site apparatus that is a source base-site and at least the base-site apparatus that is a target base-site.

18. The base-site apparatus of claim 17 wherein said means for comparing further comprises means for responding when said third signal quality value is greater than said first signal quality value plus said hysteresis value.

19. The base-site apparatus of claim 16 wherein said means for comparing further comprises means for responding when said third signal quality value is greater than said second signal quality value.

20. A method of communication transfer in a radiotelephone system having a mobile unit communicating to a source base-site, the mobile unit requiring a communication transfer from the source base-site to a selected one target base-site, the method comprising:
    obtaining, at the source base-site, a first signal quality value of a signal when received by the source base-site;
    estimating a second signal quality value;
    obtaining, at the selected one target base-site, a third signal quality value of said signal when received by the selected one target base-site;
    comparing, at the selected one target base-site, said first signal quality value to said third signal quality value during a first time period;
    transferring communication, responsive to said first step of comparing, from the source base-site to the selected one target base-site if said third signal quality value is preferable over said first signal quality value;
    comparing, at the target base-site, said second signal quality value to said third signal quality value during a second time period; and
    transferring communication, responsive to said second step of comparing, from the source base-site to the target base-site if said third signal quality value is preferable over said second signal quality value.

21. The method of claim 20 wherein said step of obtaining a first signal quality value further comprises the step of providing a hysteresis value correlating the physical location of the source base-site and the selected one target base-site.

22. The method of claim 21 wherein said first step of comparing further comprises the step of responding when said third signal quality value is greater than said first signal quality value plus said hysteresis value.

23. The method of claim 20 wherein said second step of comparing further comprises the step of responding when said third signal quality value is greater than said second signal quality value.

24. A method of communication transfer in a radiotelephone system having a mobile unit communicating to a source base-site at a predetermined signal level, the source base-site having requested a transfer of communication of the mobile unit from the source base-site to a selected one target base-site, the method comprising:
    obtaining, at the source base-site, a first signal quality value of a signal when received by the source base-site;
    providing, at the source base-site, a second signal quality value;
    providing, at the source base-site, at least a first predetermined time period and a second predetermined time period;
    obtaining, at at least the selected one target base-site, a third signal quality value of a signal when received by at least the selected one target base-site;
    comparing, at the selected one target base-site, said first signal quality value to said third signal quality value during said first predetermined time period and for comparing said second signal quality value to said third signal quality value during said second predetermined time period;
    responding, coupled to said step of comparing, during said first predetermined time period when said third signal quality value is greater than said first signal quality value and responding during said second predetermined time period when said third signal quality value is greater than said second signal quality value;

monitoring responses from said step of responding; and transferring communication, in response to said step of monitoring, from the source base-site to the selected one target base-site.

25. The method of claim 24 further comprising the step of providing a plurality of mobile unit signal level increase values, including a first mobile unit signal level increase value.

26. The method of claim 25 wherein said step of providing a plurality of mobile unit signal level increase values further comprises the step of altering the predetermined signal level by at least said first mobile unit signal level increase value.

27. The method of claim 26 wherein said step of altering further comprises the step of altering the predetermined signal level at the end of said first predetermined time period.

28. The method of claim 24 wherein said step of providing a second signal quality value further comprises the step of calculating said second signal quality value from the first signal quality value and a first mobile unit signal level increase value.

29. A method of communication transfer in a radiotelephone system having a mobile unit communicating to a source base-site at a predetermined signal level, the source base-site having requested a transfer of communication of the mobile unit from the source base-site to a selected one target base-site, the method comprising:

obtaining, at the source base-site, a first signal quality value of a signal when received by the source base-site;

providing, at the source base-site, a second signal quality value;

providing, at the source base-site, at least a first predetermined time period and a second predetermined time period;

receiving, at the source base-site, information from the mobile unit;

obtaining, at the selected one target base-site, a third signal quality value of a signal when received by the selected one target base-site;

comparing, at the selected one target base-site, said first signal quality value to said third signal quality value during said first predetermined time period and comparing said second signal quality value to said third signal quality value during said second predetermined time period;

responding, coupled to said step of comparing, during said first predetermined time period when said third signal quality value is greater than said first signal quality value and responding during said second predetermined time period when said third signal quality value is greater than said second signal quality value;

monitoring responses from said step of responding; and transferring communication, in response to said step of monitoring, from the source base-site to the selected one target base-site.

30. The method of claim 29 wherein said information received by said step of receiving further comprises the selected one target base-site.

31. The method of claim 29 further comprising the step of providing a plurality of mobile unit signal level increase values, including a first mobile unit signal level increase value.

32. The method of claim 31 wherein said step of providing a plurality of mobile unit signal level increase values further comprises the step of altering the predetermined signal level by said first mobile unit signal level increase value.

33. The method of claim 32 wherein said step of altering further comprises the step of altering the predetermined signal level at the end of said first predetermined time period.

34. The method of claim 29 wherein said step of providing a second signal quality value further comprises the step of calculating said second signal quality value from the first signal quality value and a first mobile unit signal level increase value.

35. A method of communication in a radiotelephone system having a base-site apparatus communicating to a mobile unit, the mobile unit requiring a transfer of communication from the base-site apparatus to another base-site apparatus, the method comprising:

obtaining, when the base-site apparatus is a source base-site, a first signal quality vale of a signal when received by the source base-site;

providing, when the base-site apparatus is a source base-site, a second signal quality value;

providing, when the base-site apparatus is a source base-site, at least a first predetermined time period and a second predetermined time period;

obtaining, when the base-site apparatus is a target base-site, a third signal quality value of a signal when received by the selected one target base-site;

comparing, when the base-site apparatus is a target base-site, said first signal quality value to said third signal quality value during said first predetermined time period and comparing said second signal quality value to said third signal quality value during said second predetermined time period; and transferring communication, responsive to said step of comparing, from the base-site apparatus that is a source base-site to the base-site apparatus that is a target base-site during at least either said first predetermined time period or said second predetermined time period.

36. The method of claim 35 wherein said step of obtaining a first signal quality value further comprises the step of providing a hysteresis value correlating the physical location of the base-site apparatus that is a source base-site and the base-site apparatus that is a target base-site.

37. The method of claim 36 wherein said step of comparing further comprises the step of responding when said third signal quality value is greater than said first signal quality value plus said hysteresis value.

38. The method of claim 35 wherein said step of comparing further comprises the step of responding when said third signal quality value is greater than said second signal quality value.

39. A method of communication transfer in a radiotelephone system having a mobile unit communicating to a source base-site, the mobile unit requiring a communication transfer from the source base-site to a target base-site, the source base-site coupled to the target base-site via a base-site interface, the method comprising the steps of:

obtaining, at the source base-site, a first signal quality value of a signal when received by the source base-site;

estimating a second signal quality value;

sending, via the base-site interface, said first and second signal quality values to the target base-site;

obtaining, at the target base-site, a third signal quality value of said signal when received by the target base-site;

comparing, at the target base-site, said first signal quality value to said third signal quality value during a first time period;

transferring communication from the source base-site to the target base-site if said third signal quality value is preferable over said first signal quality value;

comparing, at the target base-site, said second signal quality value to said third signal quality value during a second time period if said third signal quality value is not preferable over said first signal quality value; and transferring communication from the source base-site to the target base-site if said third signal quality value is preferable over said second signal quality value.

40. A method of communication transfer in a radiotelephone system having a mobile unit communicating to a source base-site, the mobile unit requiring a communication transfer from the source base-site to a target base-site, the method comprising the steps of:

obtaining, at the source base-site, a first signal quality value of a signal when received by the source base-site;

calculating a forecasted signal quality value;

obtaining, at the target base-site, a third signal quality value of said signal when received by the target base-site;

comparing, at the target base-site, said first signal quality value to said third signal quality value during a first time period;

transferring communication from the source base-site to the target base-site if said third signal quality value is preferable over said first signal quality value;

comparing, at the target base-site, said forecasted signal quality value to said third signal quality value during a second time period if said third signal quality value is not preferable over said first signal quality value; and transferring communication from the source base-site to the target base-site if said third signal quality value is preferable over said forecasted signal quality value.

* * * * *

UNITED STATES PATENT AND TRADEMARK OFFICE
CERTIFICATE OF CORRECTION

PATENT NO. : 5,203,010
DATED : April 13, 1993
INVENTOR(S) : Kenneth A. Felix et al.

It is certified that error appears in the above-identified patent and that said Letters Patent is hereby corrected as shown below:

Col. 5, line 22, "the selected" should be --at the selected--.

Col. 6, line 32, "said" should be --a--.

Col. 10, line 26, "vale" should be --value--.

Signed and Sealed this

Nineteenth Day of April, 1994

Attest:

BRUCE LEHMAN

*Attesting Officer*     *Commissioner of Patents and Trademarks*